US008447989B2

(12) United States Patent
Barrus et al.

(10) Patent No.: US 8,447,989 B2
(45) Date of Patent: May 21, 2013

(54) METHOD AND APPARATUS FOR TAMPER PROOF CAMERA LOGS

(75) Inventors: John Barrus, Menlo Park, CA (US); Michael Gormish, Redwood City, CA (US); Sergey Chemishkian, Cupertino, CA (US)

(73) Assignee: Ricoh Co., Ltd., Tokyo (JP)

( * ) Notice: Subject to any disclaimer, the term of this patent is extended or adjusted under 35 U.S.C. 154(b) by 926 days.

(21) Appl. No.: 12/244,714

(22) Filed: Oct. 2, 2008

(65) Prior Publication Data
US 2010/0088522 A1 Apr. 8, 2010

(51) Int. Cl.
*G06F 21/00* (2006.01)
(52) U.S. Cl.
USPC .......................................................... 713/181
(58) Field of Classification Search
USPC .......................................................... 713/181
See application file for complete search history.

(56) References Cited

U.S. PATENT DOCUMENTS

| | | | |
|---|---|---|---|
| 305,558 A | 9/1884 | Alvord | |
| 5,499,294 A | 3/1996 | Friedman | |
| 5,751,809 A | 5/1998 | Davis et al. | |
| 5,898,779 A | 4/1999 | Squilla et al. | |
| 5,898,799 A | 4/1999 | Murayama | |
| 5,946,396 A | 8/1999 | Davis | |
| 5,966,446 A | 10/1999 | Davis | |
| 5,978,475 A * | 11/1999 | Schneier et al. | 713/177 |
| 6,188,766 B1 | 2/2001 | Kocher | |
| 7,194,630 B2 | 3/2007 | Iwamura et al. | |
| 7,272,179 B2 | 9/2007 | Siemens et al. | |
| 7,305,558 B1 | 12/2007 | Miyazaki et al. | |
| 7,849,053 B2 * | 12/2010 | Wolff et al. | 707/608 |
| 8,006,094 B2 | 8/2011 | Savitzky et al. | |
| 2004/0123242 A1 | 6/2004 | McKibben et al. | |
| 2004/0220975 A1 | 11/2004 | Carpentier et al. | |
| 2005/0169499 A1 | 8/2005 | Rodriguez et al. | |
| 2006/0010095 A1 | 1/2006 | Wolff et al. | |
| 2008/0243688 A1 | 10/2008 | Hart et al. | |

OTHER PUBLICATIONS

Blythe, Paul, et al., "Secure Digital Camera," Proc of Digital Forensic Research Workshop (DFRWS), Aug. 17-19, 2004, 12 pages.
Guilshan, CA, "A Picture is Worth a Thousand Lies: Electronic Imaging and the Future of the Admissibility of Photographs into Evidence," 18 Rutgers Comp & Tech LJ, 1992, pp. 365-380.
Lukas, Jan, et al, "Digital Camera Identification from Sensor Pattern Noise," IEEE Trans on Information Security and Forensics (TISF), vol. 1 (2), Jun. 2006, pp. 1-11.
Pratt, Frances H, "The Use of Computer-Generated Exhibits in Federal Criminal Cases," Office of Defender Services Training Branch, Sep. 2001, 20 pages.
"Exchangeable Image File Format for Digital Still Cameras: Exif Version 2.2," Japan Electronics and Information Technology Industries Association, Apr. 2002, 154 pages.

* cited by examiner

*Primary Examiner* — Michael S McNally
(74) *Attorney, Agent, or Firm* — Blakely, Sokoloff, Taylor & Zafman LLP

(57) ABSTRACT

A method and apparatus for maintaining a tamper proof device log are described. In one embodiment, the method comprises maintaining an embedded log in the device, the embedded log being a chain of log entries. In one embodiment, the method may also comprise publishing at least one log entry to a location external to the device.

17 Claims, 11 Drawing Sheets

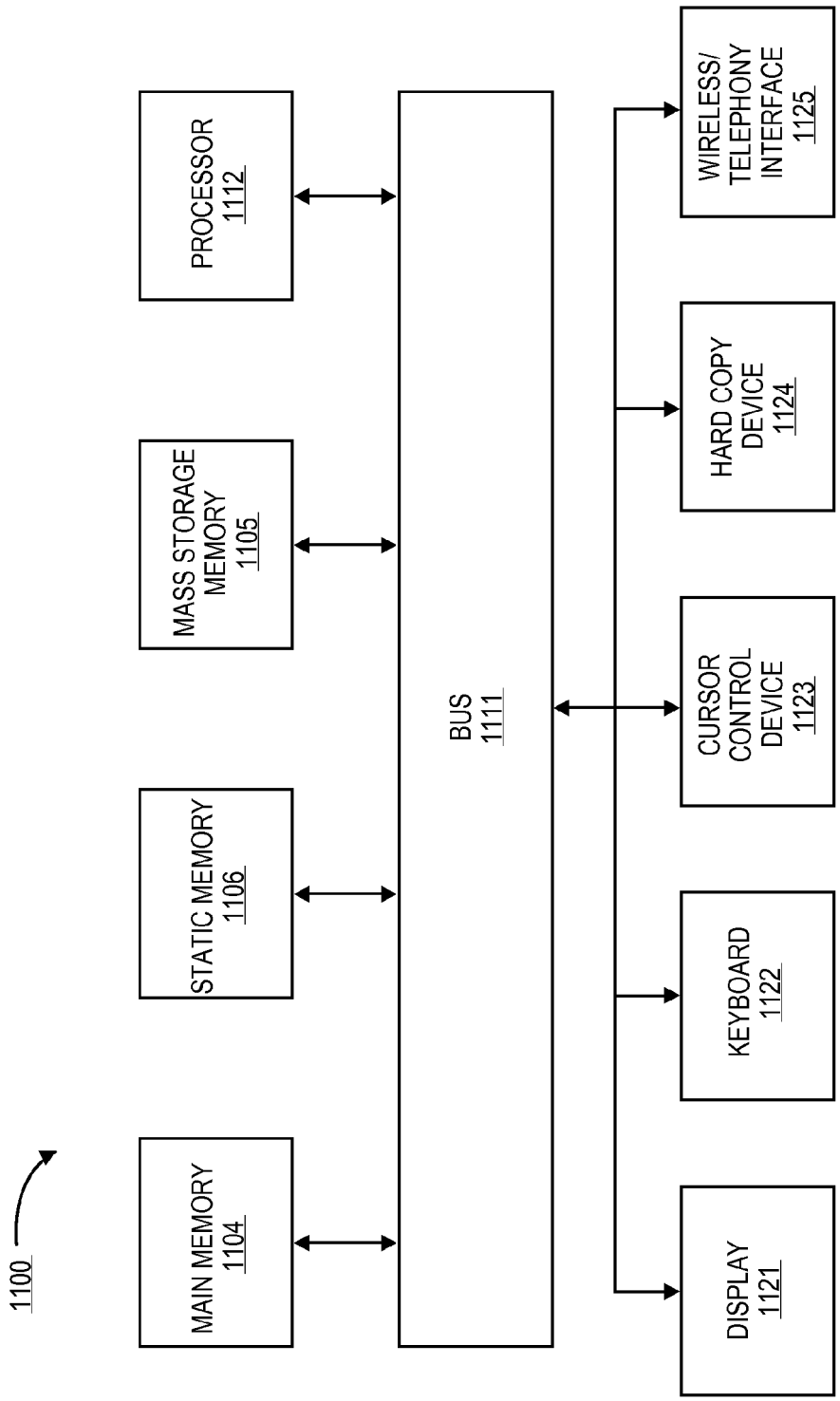

METHOD AND APPARATUS FOR TAMPER PROOF CAMERA LOGS

FIELD OF THE INVENTION

The present invention relates to the field of digital object distribution; more particularly, the present invention relates to maintaining a tamper proof camera log.

BACKGROUND OF THE INVENTION

In the modern world, digital audio, image, and video data is routinely edited, resulting in various levels of consumer data manipulation. Thus, the integrity of digital audio and video data cannot be trusted. With government and law enforcement agencies increasingly utilizing digital photographs, videos, and audio recordings, the problems associated with the lack of reliable indicators of integrity becomes more acute.

Many data management systems have been proposed and implemented in the past. These data management systems include systems that store documents, electronic photographs, digital music, as well as other data, and respond to a variety of requests. However, these systems do not easily operate across organizational boundaries and do not perform necessary synchronization and verification e.g., in the case of an audit.

A log is a data management tool used to record information. Logs may use a client-server framework to permit the addition or subtraction of content from one or more client locations to a server that hosts the web log. Because one server hosts each log, web logs are typically anchored to a particular HTTP location.

Logs are designed to provide a reliable history which in turn provides the basis of trust. Current business processes such as double entry accounting and paper trails provide traceability and support for auditing. Verification of electronic log files is necessary to provide similar accountability to that provided by paper. Verification of logs is critical in ensuring the integrity of a log, the log's history, and content referenced by the log.

SUMMARY OF THE INVENTION

A method and apparatus for maintaining a tamper proof device log are described. In one embodiment, the method comprises maintaining an embedded log in the device, the embedded log being a chain of log entries. In one embodiment, the method may also comprise publishing at least one log entry to a location external to the device.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 11 is a block diagram of a computer system that may perform one or more of the operations described herein.

DETAILED DESCRIPTION OF THE PRESENT INVENTION

Figure 1:
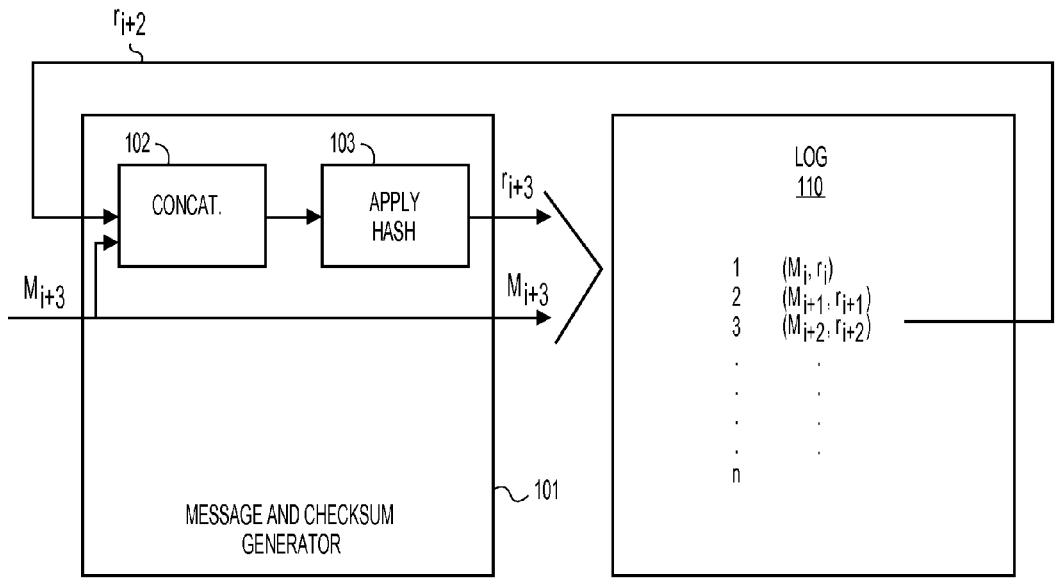
FIG. 1 illustrates generating and storing an entry in a log.

A method, apparatus, and article of manufacture for maintaining a tamper-proof camera log are described. In one embodiment, the method comprises maintaining an embedded log in a device, the embedded log including a chain of log entries. At least one log entry may be published to a location external to the device. In one embodiment, the device is a digital camera. In another embodiment, this device is a cellular telephone. At least one new log entry is added to the embedded log when media data is captured by the device, where the new log entry is a hash of the media data and a most recent entry of the embedded log. Media data purported to have been captured by the device may then be authenticated based on the prior log entries and metadata associated with those log entries.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Media Identifiers, Sequential Logs, and Entangling
Media Identifiers for Electronic Items Many of the embodiments described herein require the ability to refer to a document, video, song, an image of a piece of paper, electronic file, etc. by an identifier. For purposes herein, the document, video, song, piece of paper, electronic file, etc. are referred herein to as the media. An identifier used to identify the media is called a media identifier and, in one embodiment, is a string of bytes.

In one embodiment, there are several properties of the association between the media and the media identifier which are useful in the embodiments described herein: a) it is beneficial that anyone who has the media can determine an identical media identifier; b) it is beneficial that it is difficult for anyone to find two distinct pieces of media that have the same media identifier; c) it is beneficial that the media identifier does not reveal anything about the content of the media; and d) it is beneficial that any change to the media would result in a different identifier.

There are multiple ways to assign an identifier to a piece of media. For an electronic file, in one embodiment, the identifier is generated by applying a cryptographic hash function to the bytes of the file. Cryptographic hash functions are well known in the communications and security literature and have been standardized in various federal and international standards, and software toolkits.

Cryptographic hash functions meet the properties described above so well that the process of determining an identifier for a piece of media is sometimes referred to as "hashing" and the media identifier is at times referred to as a "hash," even if a different technique is used to determine the identifier. We refer to a media identifier computed with a cryptographic hash as a Content Based Identifier, or CBI. In one embodiment, a Content Based Identifier includes a prefix as well as the hash. In one embodiment, the prefix is used to identify the function used to compute the hash, e.g., "sha1" for the Secure Hash Algorithm SHA-1 hash function.

There are other ways to assign identifiers to files. For example, a server could keep a copy of every file and assign a previously unused string randomly to each new file. This method works very well for properties b, c, and d, but only meets property a if everyone can contact the server, and the server cannot be changed, even if taken off-line by, for example, by a denial of service attack.

It is also possible to use functions that are simpler than cryptographic hashes to identify files. For example, a simple checksum can be used on a file, and the result used as a media identifier. This meets properties a and c, but not property b. While most changes to a file will result in a different simple checksum, the simplicity of the checksum means it is easy to come up with a set of strings that can be added to a file without changing the checksum. Therefore property d is not well met by the simple checksum. For some applications these properties may be less important. Also some applications may have very structured data, such that it is difficult to find two pieces of media that both have the same checksum and follow the rules of the structured data. Thus, in one embodiment, a content based identifier is not a cryptographic hash.

In one embodiment, physical pieces of paper are assigned an identifier, for example, by scanning the paper and computing a cryptographic hash of the scanned file that results. However, because of noise in the scanning process, different scans of the paper normally lead to different electronic files, and thus different identifiers. For this reason, it is sometimes convenient to affix a barcode or other machine readable identifier (e.g., a RFID tag) to a piece of paper or other physical device. Use of a machine readable ID makes it easy for anyone to determine the same identifier from different copies of a document for example; however, it is also possible to attach the same ID value to different media, so properties b and d are not well met in this case.

In one embodiment, to overcome the weakness of machine readable ID's, a form of "finger printing" is used to identify physical media. Since finger printing associates values with the physical device, it can be very hard or impossible to make a new "finger" or piece of paper with the same finger print. However, in many cases, the "finger print" reveals something about the physical media, also it may be possible to change the physical media slightly without changing the finger print. Thus, in such a case, properties c and d might not be held perfectly.

In one embodiment, multiple identifiers are associated with a single piece of media. For example, there could be an identifier formed by using the SHA1 cryptographic hash function on the media, and an identifier formed by using the SHA256 or MD5 cryptographic hashes on the same media. In one embodiment, keyed-hash message authentication codes or HMAC are used to compute media identifiers. These message authentication codes like HMAC-MD5 or HMAC-SHA1 can be better than the underlying cryptographic hash functions (MD5 and SHA1) for properties B, C, and D because they use a key which can change. However, property A is more difficult with message authentication codes because in order to compute the same hash, all places computing it must have access to the key.

In one embodiment, different identifiers are associated with different formats of the same data. For example, the hash of a file and the hash of the ".zip" file obtained by lossless compression of the file, are different identifiers, but they are associated with the same final data.

In one embodiment, identifiers are formed for part of the media. For example, in the case of video, there could be an identifier formed for each different frame. Because of packet loss in a network, two people watching the same video might not end up with the same file, and thus they would be unable to compute the same identifier. However, each person would receive several identical frames of the video. So if they computed a hash of each frame they received, they could determine that they were watching the same video because of the large number of identical hashes.

To continue the same example, two people watching the same video might watch it at different resolutions; in this case, no two frames will have the same hash. However, if the video was stored in a scalable method, e.g. JPEG 2000 part 3, then the lowest resolution portion of the video may be the same for both viewers, and common hashes could be determined.

When video is not stored in a scalable format, a server typically stores multiple versions of a video at different resolutions. The server can thus compute a hash of all frames of all resolutions it has stored, and thus any frame received completely by a client can be hashed and the hashes later compared with those on the server to identify the video.

In addition to video, there are other types of media that may be partially transmitted. Portions of document images in PDF, JPM, or JPEG 2000 can be transmitted with a variety of resolutions, qualities, or sets of pages. XML documents may also be partially transmitted. For example, part of a large XML document may be requested. The request may be, for example, by an XPATH query. The portion of the document received by the client is different from the whole document available at the server. However, it is possible to compute hashes for portions of the documents (e.g., subtrees of the XML document) or even contents of particular nodes in the XML document. A client with a subset of the XML document can compute hashes on the subtrees and nodes that it receives, and these can be matched against a large list of hashes at the server.

For any particular media, relevant subsets of the data can often be determined and these subsets can be hashed in addition to the hash of the complete media.

In some cases, the data is processed so that the portion delivered does not actually appear in the data as a whole. For example, a color image might be converted to grayscale and then delivered, or the sum of entries in a spreadsheet might be computed and reported. However, if the data exists at two places (e.g. the server and client), then even if only modified data is delivered, it is possible for both server and client to record hashes of the modified data and the association between the received data and its source can be made at a later time.

In some cases, the "server" might not have the modified data initially. For example, if an intermediate processing device performs the computation on the data. However, if the type of computation is known, it could be later run on the server to associate the original media with the received data. For example, a server might send a high bit rate video, but due to network congestion, the video may be truncated by removing a quality layer at an intermediate router. A client thus receives a medium bit-rate video that can be hashed. In order to determine the same hashes, the server runs the hash on the high rate video without the quality layer that the router discarded.

Sequential Logs

Many of the embodiments described herein involve recording a sequence of events. The record of events is referred to as a "log" or "log-file," similar to the relationship with a log book used to record the events of a truck, ship, or aircraft, and the log files used to record the actions taken on computer systems. In one embodiment, the logs have a property that it is easy to add a new record to the end, but difficult to change a record already in the log without such a change being easily detected.

Unlike a traditional "log book" or "log file", in one embodiment, it is desirable for the log not to disclose much information about the event being recorded. In this way, the log file may be made available to a large number of people or systems so that some records can be checked, but the content of most of the records can remain secret.

There are several possible implementations of a log which have different levels of performance with respect to the goals of easy to add, hard to change, and partial disclosure of information.

A conceptually simple way to implement a log is a tamper-proof write once memory. Each record is written in order into the memory. This meets the goal of easy to add and hard to modify, but it is difficult to remotely verify that the "tamper-proof" memory has not been changed.

One method of implementing a log is to create a sequence of records where each record is made up of a message, $M_i$, and a rolling checksum, $r_i$. The rolling checksum is so named because it is computed from the current message and the previous checksum, and thus changes with each record. The rolling hash for the ith record can be computed as:

$$r_i = \text{hash}(r_{i-1} \cdot M_i)$$

where the message and the previous checksum are concatenated (represented by the ".") and provided to the hash function. The log in this case consists of a sequence of messages and checksums ($M_i$, $r_i$). In one embodiment, an addition to the log may be made by taking the last checksum and the current message, concatenating the two, and computing the hash. This is shown in FIG. 1. Referring to FIG. 1, to create a new message and checksum pair, a message and checksum generator 101 receives a new message, $M_{i+3}$ and the checksum $r_{i+2}$ of the last entry in log 110. A concatenation module 102 concatenates the previous checksum $r_{i+2}$ with the message $M_{i+3}$. Hash module 103 applies a hash function, as described herein, to produce the next checksum $r_{i+3}$. Message $M_{i+3}$ and checksum $r_{i+3}$ are then stored in log 110. Note that message and checksum generator 101 may comprise a processing unit (e.g., a microprocessor) with concatenation module 102 and hash unit 103 being software modules of instructions that are executed by the processing unit. Alternatively, these functions could be implemented in hardware.

If one of the messages in the log is modified, or one of the checksums in the log is modified, then with high probability the subsequent checksum value recorded in the log will not correspond to the hash of the message and previous checksum. Thus modifying a record in a manner that cannot be detected would require changing the message and recomputing all subsequent checksums. If one of the checksums is copied and stored elsewhere, then any modification prior to that checksum can be detected. If a modification is made without updating the checksums, then recomputing the rolling checksums or hashes in the log reveals the error. If the rolling checksums are all changed so the log is self consistent, then the modified checksums won't match the previously externally saved checksums.

As set forth above, the hash function could be a simple checksum, but preferably is a cryptographic hash function.

This method of creating a log meets most of the goals for the log, but there are variations which provide additional benefits.

One modification is to store the hash of the message rather than the message itself in the log. Thus, if $m_i$ is defined as:

$$m_i = \text{hash}(M_i),$$

then a log can be defined as a sequence of $(m_i, r_i)$, with $r_i$ being a checksum of only the message hash and the previous checksum:

$$r_i = \text{hash}(r_{i-1} \cdot m_i).$$

Figure 2:
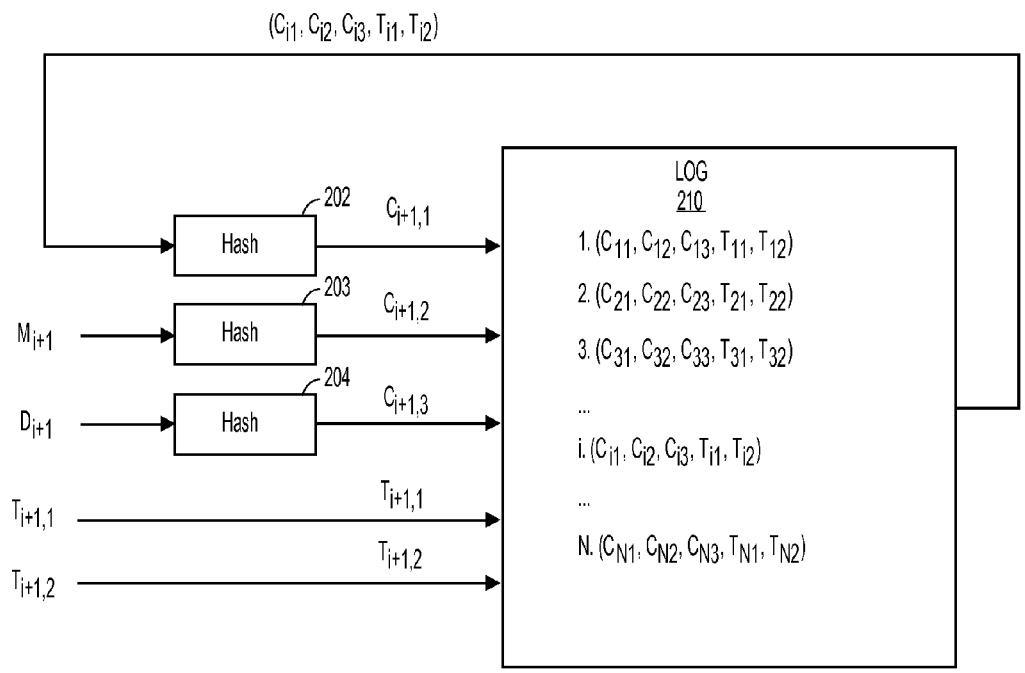
FIG. 2 illustrates generating and storing a hash of media in a log.

Another embodiment of a log is shown in FIG. 2. Referring to FIG. 2, to generate the i+1st log entry, the ith entry from log 210 is fed back to hash generator 202. Hash generator 202 utilizes a hash function to produce a Content Based Identifier, $C_{i+1,1}$ which becomes part of the new log entry. Several messages or message hashes may be added to the log at the same time. In FIG. 2 there are 4 messages shown, each of which could be a media file, metadata item, a CBI from another log, or string of bytes of any sort. Two of the messages, $M_{i+1}$, and $D_{i+1}$ are separately hashed by hash generators 203 and 204 to produce $C_{i+1,2}$ and $C_{i+1,3}$ which become part of the new log entry. Finally, messages $T_{i+1,1}$ and $T_{i+1,2}$ are stored directly in the log without hashing. A variable number of hashed messages and unhashed messages may be included. Some logs may not use any unhashed messages, or always use the same number of hashed and unhashed messages, or the unhashed messages may be of a fixed length or format to allow for easy parsing.

Storing the hash of a message rather than the message in the log has the advantage of producing fixed length records provided that the hash function has a fixed length, which is commonly true. This method has the further advantage of not having any message content in the log. Thus, if the message was some customer information (e.g., a purchase order with name, address, and order information), it would not be desirable to publish the message. However, if the hash used does not reveal information about the message, then the entire sequence of $(m_i, r_i)$ i.e. the log, can be published without revealing the sensitive customer information.

In some embodiments, more than one message $M_i$, $M_j$, $M_k$, etc. might be appended to the log as a single atomic transaction. A single hash function can be applied to the entire record with the message hashes arranged in a chosen order, producing the checksum $r_i$.

In one embodiment, the record and rolling checksum are structured slightly differently. In this case, each entry in the log is considered as a piece of media, and a cryptographic hash based identifier for the previous media is stored in the log along with the hash of the current message. Thus, a log consists of a sequence of $(p_i, m_i)$ where $m_i$=hash $(M_i)$, and $p_i$=hash$(p_{i-1}, m_{i-1})$.

In some cases, it is desirable to have a log with more information than solely the hash of the message. For example, it is often useful to have the time stored in the log or the type of information of the log entry stored in the published log. This makes it easier to search the log for specific records. Thus, then in one embodiment, if the information in a record that is readable is defined as the "plain text", called $t_i$, the log consists of a sequence of $(t_i, m_i, r_i)$, and each checksum, $r_i$, is computed as:

$$r_i = \text{hash}(r_{i-1} \cdot t_i \cdot m_i)$$

This format is quite general because the $t_i$ portion could contain further structure (e.g., always a date and a type and a file name) while the messages could also be structured. Of course, the order of the previous rolling checksum, the current message or message hash, and "plain text" information can be changed, as long as the order is known to all applications needing to generate or verify a checksum.

Another way to provide partial access to information in a log is to encrypt some of the information stored in the log. Suppose the encrypted information for a log is $E_i$, and the hash of $E_i$ is $e_i$. In one embodiment, either $E_i$ or $e_i$ can be stored in the log. Thus, a log entry might consist of $(t_i, m_i, E_i, r_i)$, i.e. a plain text portion, a hash of the message, some encrypted data and a hash of the previous hash in the log and concatenated with the hash of the message. In general, there could be a mix of times and a record might have several plain text portions, several encrypted portions, and several hashes of messages.

In one embodiment, the format for log entries is a set of header "lines" and a body with data, e.g.

Author: gormish
SHA1: 1bff5d8cda307b5f3f3757cb25588a54cfb01ce0
Content-Length: 567
567 bytes of DATA In one embodiment, this type of format is used for http and email. Thus, several well-known headers have already been defined for those applications and could be used in a log.

Different keys can be used for different encrypted entries or different types of encrypted entries in the log. For example, all log entry publication information might be encrypted with one key, all classification values with a different key. If the log is associated with a single document and that document is encrypted, then the entries in the log might be encrypted with the same key as used for the document. That way, anyone with access to the document is also granted access to the information in the log.

Another method of implementing logs is through content based identifiers (CBIs). In one embodiment, a CBI is a sequence of bytes computed as a one way hash of a piece of media, representing a document, image, scanned piece of paper, etc. The CBI consists of two parts, a hash type used to compute the hash value and the hash value itself. In one embodiment, the hash type is defined by a five byte string indicating a hash type of md5, sha1, sha256, or Null, though other types of hashes may be utilized.

Log entries are made up of two or more CBIs, where the first CBI is either an initialization value or a reference to a previous log entry. The second and subsequent CBIs are content, such as other log entries, data, arbitrary strings of bytes, etc. An exemplary grammar for a log entry is:

```
entry = prev-ref 1*("-" content-ref)
prev-ref = cbi
content-ref = cbi
cbi = md5cbi | sha1cbi | sha256cbi | nullcbi
sha1cbi = "sha1." 40LOWHEX
md5cbi = "md5x." 32LOWHEX
sha256cbi = "s256." 64LOWHEX
nullcbi = "null."
LOWHEX = "a" | "b" | "c" | "d" | "e" | "f" | DIGIT
DIGIT    = <any US-ASCII digit "0".."9">
entry-line = "Entry:" SP entry CRLF
CRLF = CR LF
CR       = <US-ASCII CR, carriage return (13)>
LF       = <US-ASCII LF, linefeed (10)>
log-chain = *entry-line
```

An entry line is utilized to store CBI log entries in a text file, or other string based data structure, and a log chain is a sequence of log entries where every entry beyond the first contains the hash of the previous entry. Thus, in one embodiment, a sequence of syntactically correct log entries where any entry other than the last does not contain the correct hash of the previous log entry is an invalid log chain. One embodiment of verification of a log chain is described in greater detail below. An exemplary log chain is:
Entry: null.-
  sha1.a72bfa0145c55eeb34400fa28489d3023dcb34e4
Entry:
  sha1.940f74e519e28fb9e5578291339251aea295fa2d-
  sha1.a9993e364706816aba3e25717850c26c9cd0d89d
Entry:
  sha1.91f09dd09691e697cc5d9dba7515bc1a92177fa4-
  sha1.84983e441c3bd26ebaae4aa1f95129e5e54670f1

The exemplary log chain file above includes three complete log entries.

While log entries may be stored in a file, in one embodiment, log entries are also stored as records in a database. For example, a shared document scanner is connected to a network, scanned documents are created as PDF files on the scanner, and distributed somewhere on the network, depending on user input. The scanner keeps track of where documents are initially distributed, and the date of capture and the cryptographic hash of the PDF file containing the scan. The scanner does not store the contents of all files (scans), but does store the hash of all files. In one embodiment, the scanner stores log chains with verification data about the scans in a database, such as an SQL database table. In another embodiment, the log chain provides verification information about the scans and the records in database tables. Although the example above discussed a scanner utilizing log chains, mail servers, multi-function printers, etc. may also be configured to create and log CBI entries.

In one embodiment, as discussed above, a log supports different multiple rolling hashes or different types of hashes, i.e. hashes computed with different cryptographic hash functions. For example, in one embodiment, the value $r_i$ is as follows:

$$r_i = \text{hash}(r_{i-1} \cdot t_i \cdot m_i)$$

and the value of $t_i$ specifies which hash function was used (e.g., MD5, SHA1, SHA256, etc.). In one embodiment, a log entry with two different rolling checksums has entries like:

$$(t_i, m_i, r_i, s_i)$$

where $r_i$ is computed as:

$$r_i = \text{SHA1}(r_{i-1} \cdot t_i \cdot m_i)$$

and $s_i$ is computed as:

$$s_i = \text{SHA256}(s_{i-1} \cdot t_i \cdot m_i)$$

As with the single rolling checksum case, the sequence of $r_i$, and $s_i$ can started by setting $r_0$ and $s_0$ to a preset initialization value, or to the hash of some media. This allows the same log to be used with systems that only support one type of hash, and if one hash function is broken, the other hash function may still be valid, and the combination of both is likely to be even harder to break. Other arrangements with logs using two or more hash functions would be apparent to those skilled in the art.

It should be noted that log entries can be added which retrospectively add new hash chains to a log. Suppose a log consists of pairs of messages and rolling hashes $(M_i, r_i)$, with $r_i = \text{SHA1}(r_{i-1}, M_i)$, with i between 1 and N. New messages can be added to the log which consists of the old messages and a new rolling hash computed with a different hash function. Thus, message N+1 could be the first message concatenated with a rolling checksum computed using a new hash function.

In general:

$$M_{N+1} = M_i \cdot s_i$$

where $$s_i = \text{SHA256}(s_{i-1}, M_i)$$

This allows the later repair of logs whose hash functions have been compromised, by adding a new hash covering the same material. Any number of hash functions can be applied retrospectively in this fashion, as hash functions are compromised and new functions are discovered.

In one embodiment, a second hash function makes use of the first hash function in its computation. For example, $$s_i = \text{SHA256}(s_{i-1} \cdot t_i \cdot m_i \cdot r_i)$$

or $$s_i = \text{SHA256}(r_{i-1} \cdot s_{i-1} \cdot t_i \cdot m_i)$$

Storage for a Log

In one embodiment, a log is stored sequentially in a single file. This sort of log is very easy to create because the rolling hash from the last entry is read, and new data is appended to the end of the file. If the entries are fixed length, it is easy to find a specific entry in the file. In many cases, a single file is sufficient especially if the log does not have too many entries.

In some cases, the log may become very long, usually because a record of a frequent event is being made. If a log is used to accumulate data from multiple sources, there could be several entries per second. In this case, it may be useful to break a log into multiple files, for example, after every 10,000 entries.

In another embodiment, each log entry is stored in a separate file. In this case, a pointer to the most recent entry is used for fast access. In one embodiment, the record has a sequence number inside it, and the most recent record can be determined by examining all record numbers. One technique is to name the file with the rolling hash, and include the rolling hash of the previous record in the file. In this way, it is possible to go from the most recent entry back through all the entries by following the pointer.

In another embodiment, each log entry is a record in a database. This is quite useful to enable rapid search for a particular message hash, rolling hash, range of times, plain text, or whatever the rest of the content of the log entry contains. A database implementation is useful when large numbers of entries are being made in the log because databases provide transactional integrity.

Write Once Memory

In addition to the computational methods of insuring that events occur in sequence, in one embodiment, a physical tamper proof device may be used to store a sequence of events. In one embodiment, the physical tamper proof device is a write once memory that stores the hashes of messages in order. Changing the entries in this sort of log would require changing the memory.

While write once memory is simple, it is hard to verify remotely that it hasn't been tampered with. Thus, in one embodiment, a tamper proof system provides digital signatures or other authentication techniques for its content.

Publishing Log Entries

Because it is relatively easy to modify a single log in a manner that is not detectable upon examination of that log in isolation, in one embodiment, information is exchanged between logs in such a way that modification of the entries in one log can be detected by examining another log. It is important to store information in the second log that depends on a range of log entries in the first log. For the logs defined previously, the rolling checksum has that property. Each checksum depends on the previous checksum and the other data in the log entry. Thus, if any part of a log entry is changed, the rolling checksum changes, and the rolling checksums after that point also change. Regardless of the computation function used for the "hash," if the messages or records contain more bits than the hash, there exist multiple messages or records that have the same hash. However, if the function used for the rolling checksums are well chosen, e.g. a cryptographic hash function, it is extremely difficult to find these messages.

There are several ways to store information from one log in another log. This process is called publishing or entangling because after storing information from one log in another, all future rolling checksums in the second log depend on the information in the first log.

In one embodiment, one log is being used to store pairs of message hashes and rolling hashes, i.e. $(m_i, r_i)$, and the rolling hash from the first log is used as the message hash for an entry in a second log. Thus, all rolling hashes after that entry in the second log depend on the rolling hash from the first log.

While this is the simplest embodiment, the limited amount of information stored when publishing can make it difficult to determine what the nature of the hash is. Thus, in one embodiment, additional information is included in the log entry used for publication. For example, those logs using a type value can set the type to indicate that the data is not a "regular message" but an "external checksum." Further, instead of using a rolling checksum directly in place of the message hash, a message can be formed which contains the rolling hash from the first log and the location of the first log (e.g., a server name, a log name, a file name, URL, etc.). In one embodiment, the location of the rolling hash in the first log is included (e.g. a sequence number, date, etc.). This embodiment allows a log to be followed backwards and allows determination of the other logs on which the current log depends.

Figure 3:
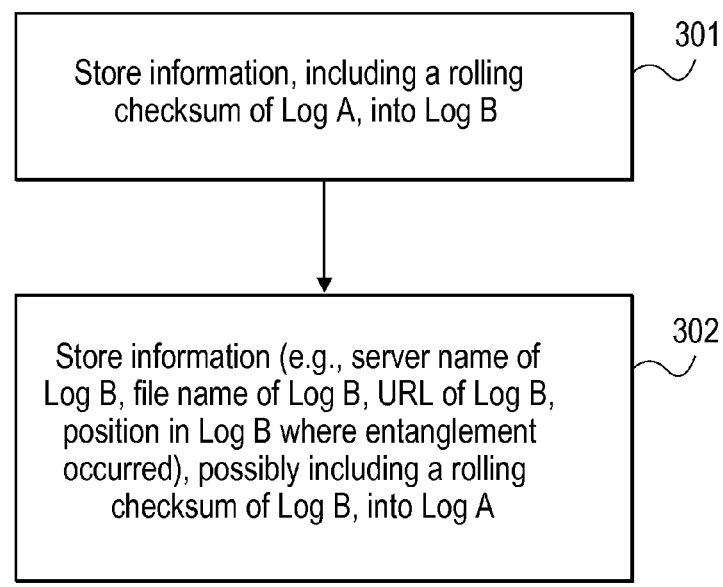
FIG. 3 is a flow diagram of one embodiment of a process for entangling a pair of logs.

In many cases, it is desirable to determine which logs contain information from a first log. In order to facilitate this, information can be stored in both logs when checksums are published. FIG. 3 is a flow diagram of one embodiment of a process for publishing or entangling a pair of logs. The process is performed by processing logic that may comprise hardware (circuitry, dedicated logic, etc.), software (such as is run on a general purpose computer system or a dedicated machine), or a combination of both.

Referring to FIG. 3, the process begins by processing logic storing information, including the current rolling checksum of log A into a log entry in log B (processing block 301).

Next, processing logic stores information about log B in log A (processing block 302). In one embodiment, the information stored in log A about log B may include the server name, file name, or URL of log B and the position in the log where the entanglement is stored. In one embodiment, the information stored in log A may also include a rolling checksum from log B. If this checksum is stored in the log, the publication is both from log B to log A and from log A to log B.

Verification Procedure

In many situations, it is necessary to determine if a log has been modified since it was created. This is best done by software, computer systems, and people independent from the log generation hardware, software, and people.

In one embodiment, to determine if a log is self consistent, verification software such as in a computer system of FIG. 11 or a dedicated machine recomputes the rolling hash for each entry in the log. If the rolling hash computed by the verification software matches the rolling hash stored in the log, then the entry associated with the rolling hash has not been changed unless the hash function has been compromised. For purposes herein, the hash function "being compromised" means two distinct sequences of bytes have been found that yield the same hash.

To determine if entries in a log are consistent across multiple logs, the entries must be consistent from the message of interest up to and including a rolling checksum that is published in or entangled with another log. The entries in the second log must be self consistent before and after the published entry. If Log A has entries which are published to Log B, Log A and Log B may be referred to as being entangled.

An Example of a Hash Chain Detection Procedure

Figure 4:
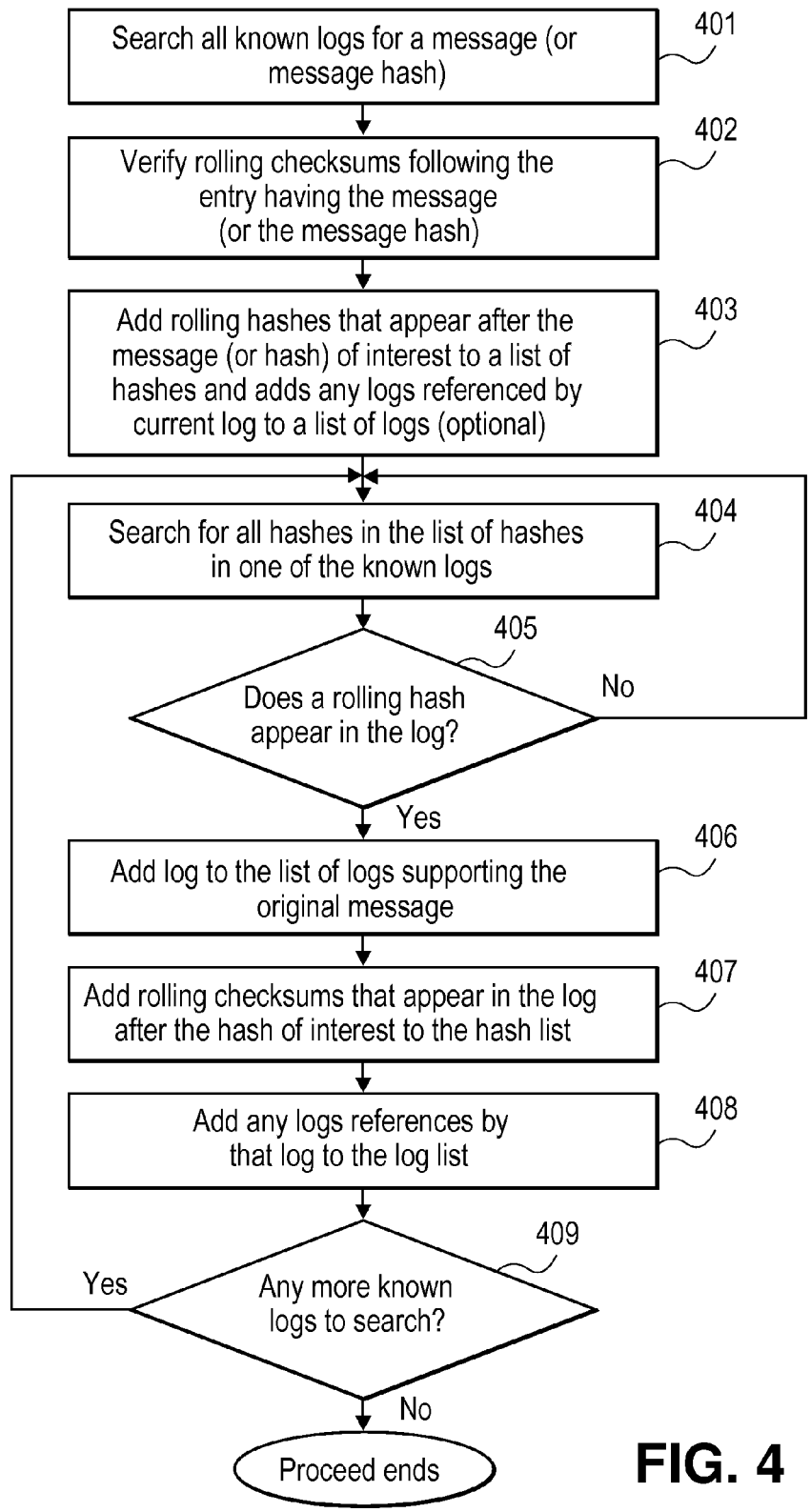
FIG. 4 is a flow diagram of one embodiment of a process for performing hash chain detection.

If a third party wishes to determine the validity of a message stored in a log some time after the entry was made and rolling checksums were published to other logs, hash chain detection allows all servers which have entries that are consistent with the message to be determined. FIG. 4 is a flow diagram of one embodiment of a process for performing entry verification. The process is performed by processing logic that may comprise hardware (circuitry, dedicated logic, etc.), software (such as is run on a general purpose computer system or a dedicated machine), or a combination of both.

Referring to FIG. 4, the process begins by processing logic initializing a list of servers that have evidence to the empty set, initializing the list of messages or hashes of interest to the single message or hash desired and searching for the message or message hash of interest on all known logs (processing block 401). If the message or its hash is not found anywhere, no verification is possible and the process ends.

If a message or hash of interest is found, then the processing logic verifies the rolling checksums following the entry containing the message or hash, for every log where the message or message hash is found (processing block 402). In one embodiment, this is done by recomputing the checksums $r_i$ for the log using the verification software.

Processing logic adds all rolling hashes that appear after the hash of interest to a list of hashes, and adds any logs referenced by the current log to a list of logs of interest (processing block 403). Some logs will not list other logs, in which case there is nothing to perform for this sub-step.

Processing logic searches for all hashes in the hashes of interest list in one of the known logs that has not been searched (processing block 404). Afterwards, processing logic tests whether a rolling hash appears in the log (processing block 405). If not, the process transitions to processing block 404 where the process continues. If a rolling hash appears in a log, processing logic adds that log to the list of logs with evidence about the original message or hash (processing block 406), and adds all rolling checksums that appear in the log after the hash of interest to the hash list (processing block 407) and adds any logs referenced by that log to the log list (processing block 408).

Processing logic then checks whether there are any more known logs to search (processing block 409). If not, the process ends. If so, processing transitions to processing block 404 and repeats the process until no new hashes are added to the list of hashes of interest, and no new logs are added to the list logs.

In general, many logs may be stored on the same device, same office, or same company. However, if a log is entangled with logs on multiple physical devices, or with logs which are under the control of different companies, then confidence in verification of the logs will be increased, because some of the logs used for verification are outside the control of the initial entity. This benefit of publishing to different devices means that the logs should be able to store addresses of entangled logs that cross company and device boundaries. One way to do this is to use a URL to identify a log.

In general, the technique described above to verify logs can involve a lot of operations. However, the complexity can be reduced by keeping better track of hashes and logs that have been previously searched. Complexity can also be reduced by only considering log entries occurring before a certain time, or searching certain logs first, for example if it is known that certain logs are used for entangling more often these can be searched earlier. Other search procedures can be used, for example, starting the search with a trusted server and looking for entries that have been published to that server.

Authentication Via Logs

The rolling checksum in a log can be used as part of an authentication mechanism. For example, knowledge of the most recent rolling checksum $r_N$ could be used as permission to write an additional entry to a log. A device keeping a log could insist that the most recent checksum be provided with the new log entry. By doing so, if two other devices know the current checksum, and both request to write to the log, only one will succeed. The first device to provide a new log entry will cause the checksum to change, and then the second device will not have the correct checksum. This technique provides a way to insure that new data is added to the log only if the provider of the data has the most up-to-date information about the log. Thus, the checksum can be used as a form of "lock" on the log to prevent race conditions.

The above discusses using the rolling checksum to control access to the log, but the rolling checksum can also be used to prove that the same log is being used again. In this case, the full contents of the log should not be publicly available. Someone could make a first interaction with a system using a log, and store a message in that log, and provide the rolling hash to the system. In a subsequent interaction, the system could ask for the rolling hash used to make the deposit. If more security is desired, in one embodiment, the system asks for information about that rolling hash (e.g., the hash of that rolling hash and a challenge string). The system could ask for several pieces of information about a previous interaction that could only be answered by someone in possession of the log.

In one embodiment, the term 'rolling checksum' is used herein to mean a string of bytes computed by a function, such as a cryptographic hash, on previous portions of a log. The portions of the log used in the computation vary from application to application. In one embodiment, a Content Based Identifier, or CBI, is used in the same way when the CBI is computed for a portion of a log, or computed for media (e.g., a digital photograph) that is not part of a log. In one embodiment, a hash chain is used to refer to a sequence of entries where each entry contains a rolling checksum, and all of the data in the hash chain before the final rolling checksum is part of at least one of the rolling checksums.

In one embodiment, verifying a rolling check sum or CBI includes operating the function used for the rolling checksum or CBI on the appropriate data, and comparing the computed result with the stored value. If the computed value and the stored value are the same, the rolling checksum is valid, consistent, verified, etc. In one embodiment, verifying a hash chain is used to mean verifying a sequence of rolling checksums or CBIs in the hash chain and comparing the computed results with the values stored in the hash chain. In one embodiment, a hash chain, where all of these computations produce results equivalent to the values stored in the hash chain, is said to be consistent. A consistent hash chain where the final entry is stored by a trusted entity is said to be verified. Furthermore, a hash chain where even one computation fails to produce the value stored in the hash chain is said to fail verification, be inconsistent, or be invalid.

In one embodiment, a hash chain begins with an item of media, and then a sequence of log entries. In this case, the CBI for the media must be in the first entry in the hash chain. Thus, verification includes computing the CBI for the media and comparing the computed value with the value in the first entry. In one embodiment, an item of media is verified by having a hash chain beginning with the media and ending at a log entry from a trusted entity. A properly formed log is a hash chain. In one embodiment, a log is a local collection of log entries with each rolling checksum in the same position in the entry.

In one embodiment, hash chains may be created from log entries stored in multiple locations and part of multiple logs. Logs may be created for a variety of reasons. In one embodiment, when a log contains information associated with a particular media, it may be referred to as a document log. In one embodiment, when a log is associated with a process, server, or collection of media, it may be referred to as a device log. The terms device log and document log may be used to imply typical usage, but do not limit the application to only one type of information.

Camera Logs

In one embodiment, a digital camera includes a tamper proof, or tamper evident, log for data captured and stored by the digital camera utilizing the techniques discussed above herein. In one embodiment, by maintaining a local log with running media data and metadata file hash chains, and publishing the local log to external systems, the digital camera creates a verifiable tamper-evident log, thereby enabling the integrity of media data captured by the digital camera, as well as metadata created by the digital camera, to be established. Beneficially, an indication of integrity of audiovisual data and associated metadata (e.g., EXIF information) captured by the digital camera is obtained from the digital camera and media data, without requiring a cryptographic key to authenticate the media data. Furthermore, the media data and associated metadata may also be placed into a verified temporal and geospatial context, in embodiments discussed herein.

Figure 5:
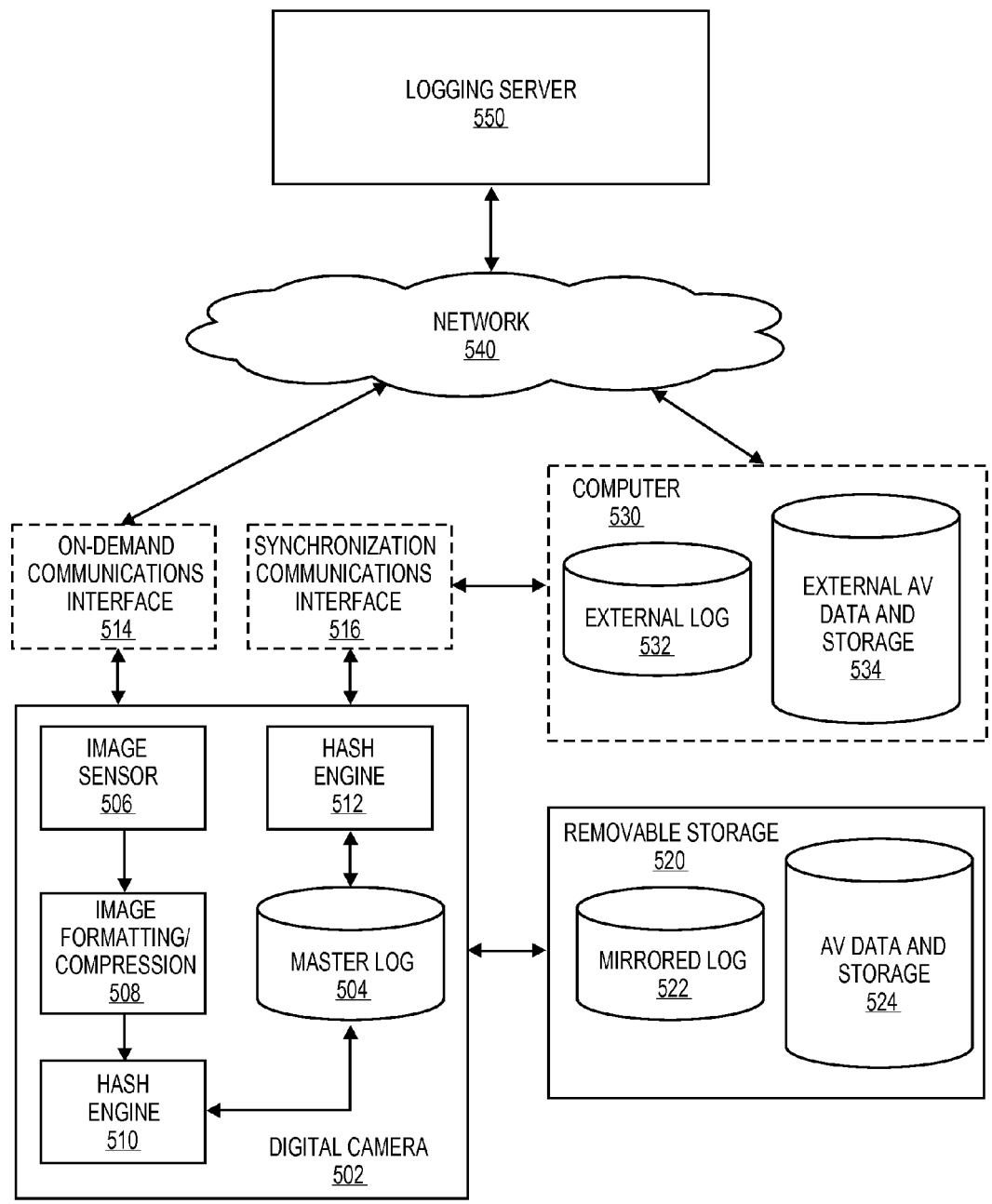
FIG. 5 illustrates one embodiment of a system for utilizing tamper proof camera logs.

FIG. 5 illustrates one embodiment of a system for utilizing tamper proof camera logs. In one embodiment, digital camera 502 maintains a local embedded log, referred to herein as the master log 504, which is mirrored to device storage 520 of digital camera 502. In one embodiment, device storage 520 may be a removable memory card, or internal memory "published" to external storage via a communications interface. The communication interface may comprise a universal serial bus (USB), FireWire, Bluetooth, etc. The mirrored log 522 replicates the master log 504 and is stored in the device storage 520, which is accessible to external systems (e.g., logging server 550 and/or computer 530) that may interface with the mirrored log 522. In one embodiment, master log 504 is maintained in an inaccessible memory of digital camera 502 to ensure that no users, systems, or entities outside of digital camera 502 access and alter master log 504. In one embodiment, the master log is made inaccessible by being stored in write once memory, not being stored in removable media, essentially blocking the master log from an external system when the digital camera 502 enters mass storage mode (i.e., transfers images and data to computer 530), etc.

In one embodiment, when media data is captured by the digital camera 502 at the image sensor 506, image formatting/compression module 508 converts the raw media data to an appropriate format, such as, for example, JPEG, JPEG2K, EXIF, etc. files for pictures, MP3, EXIF, etc. files for audio, and MPEG files for video. Other file formats known in the art may be utilized to store captured media data including public and proprietary camera raw formats. The formatted/compressed media data is then stored in audiovisual (AV) data and storage 524 of device storage 520. In one embodiment, digital camera 502 may include or be coupled with additional sensors (not shown) such as accelerometers, temperature sensors, global positioning unit sensors, chemical sensors, etc. in order to capture and log data associated with those sensors as discussed herein.

In one embodiment, as discussed in greater detail below, a chain of log entries is created in response to the capture of media data and/or creation of metadata. In one embodiment, a log entry for storage in master log 504 is created for each media data file and associated metadata file created by digital camera 502. In one embodiment, hash engine 510 creates each new log entry as a hash of a media data file and prior recorded log entry(s) stored in master log 504.

In one embodiment, digital camera 502 maintains master log 504 in tamper resistant hardware storage that is only accessible to digital camera 502. Thus, in order to publish (i.e., entangle) log entries to external systems, portions of master log 504 are copied by digital camera 502 to the metadata of a media data file (not shown) produced when media data is captured. In one embodiment, when the media data is captured by sensor 506 and formatted into an image file, audio file, or video file, information from master log 504 is added to the media data file. The media data file is then written with the master log 504 information to audiovisual (AV) data and storage 524 of device storage 520. In one embodiment, device storage 520 is a removable memory (e.g. a flash memory card).

In one embodiment, master log 504 is updated via two hash engines 510 and 512. In one embodiment, hash engine 510 updates master log 504 with a hash of a captured media file and at least a last stored log entry. In one embodiment, hash engine 512 updates master log 504 by computing hashes of log entries stored in master log 504, from the log entries alone and without the capture of new media data. In another embodiment, the master log 504 is updated with external information from an interface of digital camera 502. Updates received from an interface, however, do not replace data stored in master log 504, and is marked in the log as not being camera sensor data.

In one embodiment, log entries that are stored in master log 504 are mirrored to mirrored log 522 in device storage 520. Because device storage 520 includes prior log entries, only new log entries added to master log 504 are copied to mirrored log 522. In one embodiment, mirrored log 522 may be stored in removable storage (e.g., a flash memory card) and/or to a storage that is exposed when the camera connects to a PC.

Digital camera 502 periodically publishes log entries to external systems, such as an office (e.g., a system of the Patent Office), a service (e.g., a time stamping system), an organization (e.g., a system at a Police station), a personal computer coupled with the digital camera, a multi-function printer (MFP), etc., in order to entangle captured media data and associated metadata with external systems. However, because master log 504 is inaccessible to systems outside of digital camera 502, entries from mirrored log 522 are published to external systems. As will be discussed below, in one embodiment an on-demand communications interface 514 of digital camera 502 publishes log entries from mirrored log 522 directly to a logging server 550 maintained by an external system. The on-demand communications interface 514 may be a WiFi uplink, EDGE uplink, Bluetooth uplink, etc. In one embodiment, camera logs can be published to logging server 550 each time digital camera 502 captures new media data, edits existing media data, establishes a connection with network 540, etc. In embodiments where on-demand communications interface 514 maintains a connection to network 540, log entries may be published per each new log entry, i.e. per each stored file, be it a full-size image, a generated thumbnail, a metadata file, etc.

In another embodiment, where a camera may not include on-demand communication interface 514, or the interface 514 is disabled, synchronization communications interface 516 copies the mirrored log 522 to an external log 530 stored at computer 530. In this embodiment, device storage 520 is a removable storage (e.g., a flash memory card), and/or synchronizes with a PC computer via a physical connection, USB interface, FireWire interface, Bluetooth interface, etc. connection, thereby exposing device storage 520 to computer 530. When device storage 520 is connected (e.g., physically connected by a USB cable, removable flash storage read by computer 530, local wireless connection, removable memory card, etc.) to computer 530 to export media data, a media synchronization application (not shown) of computer 530 copies new images, along with entries from mirrored camera log 522 from device storage 520, and merges/appends these mirrored log entries to external log 532.

In one embodiment, computer 530, on behalf of digital camera 502, publishes entries in external log 532 to logging server 550. The publication record is added to external log 532 stored at computer 530, with a corresponding publication record created and stored in mirrored log 522 of device storage 520. When device storage 520 is returned to digital camera 520 camera, or when digital camera 502 is disconnected from computer 530 (i.e., leaves a mass storage mode of operation), digital camera 502 detects presence of a publication file(s), and imports it into master log 504. In one embodiment, publication files are stored with identification data to indicate that the publication files were received from an interface of digital camera 502, and not from camera sensor data.

In one embodiment, external log 532 is an external mirror of mirrored log 522 on computer 530. Furthermore, synchronization communications interface 516 copies log entries from mirrored log 522 to external log 532 when media data stored in AV data and storage 524 is transferred to computer 530 for storage at the computer's external AV data and storage 534.

In one embodiment, depending on the capabilities of the digital camera 502, camera logs can be published to one or more external systems for each log entry added to a master log 504, each capture of media data by the digital camera 502 (e.g., capturing a digital picture, video, audio, etc.), each time media data is uploaded by digital camera 502 to computer 530 (i.e., when the digital camera 502 synchronizes its memory with an external system), on a schedule, when the digital camera detects a useable data network (i.e., when the digital camera is in range of a wireless fidelity (WiFi) access point, cellular tower, wireless local area network (WLAN), etc.).

In one embodiment, digital camera 502 publishes log entries to logging server 550 even when no new media data has been captured (since a last publication of log entries). In one embodiment, such publication of existing log entries is performed by digital camera 502 in order to establish the most accurate context for future media data captures. Furthermore, log entries may also include metadata, such as time stamps and possibly geospatial markers which may be authenticated as discussed herein.

Therefore, in embodiments discussed herein, camera logs published to external systems can be used as a proof that a particular captured media data and associated metadata have been taken by a particular camera between two publication events, as discussed in greater detail below. Furthermore, this particular media data appears in a particular order in time-ordered sequence media data captures taken between the two publication events.

Figure 6A:
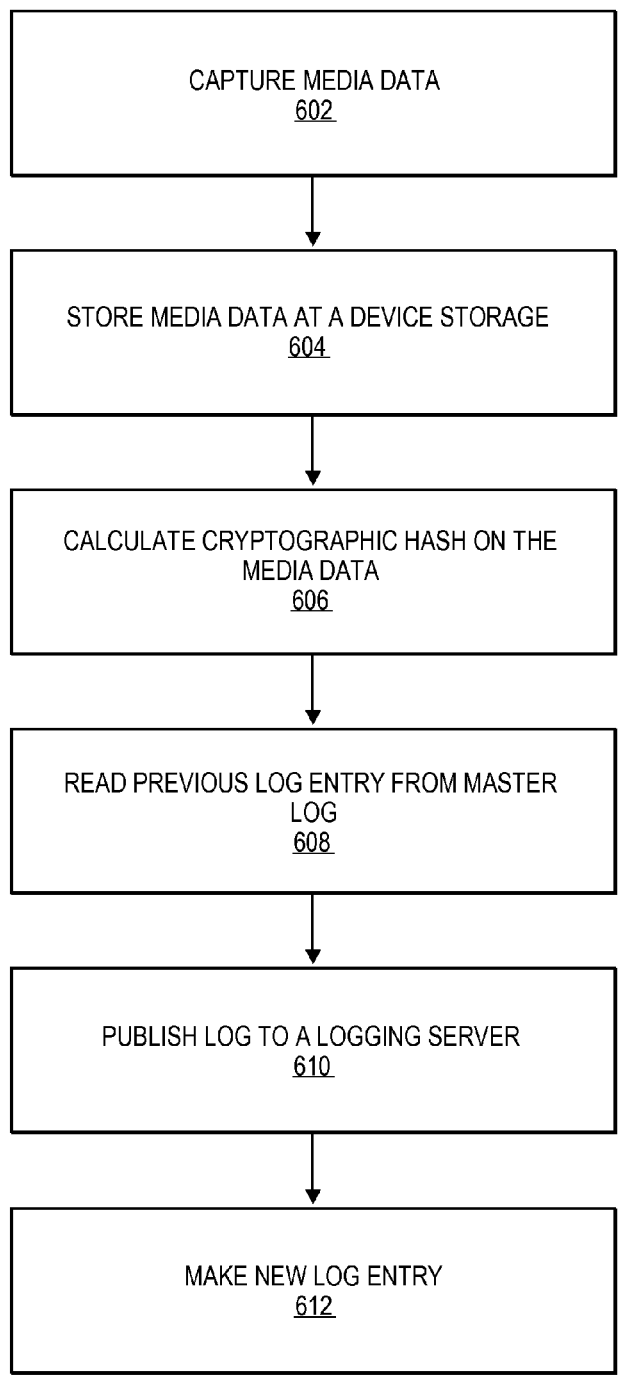
FIG. 6A is a flow diagram of one embodiment of a process for maintaining a camera log.

FIG. 6A is a flow diagram of one embodiment of a process for maintaining a camera log. The process is performed by processing logic that may comprise hardware (circuitry, dedicated logic, etc.), software (such as is run on a general purpose computer system or a dedicated machine), or a combination of both.

Referring to FIG. 6A, the process begins by processing logic capturing media data (processing block 602). In one embodiment, the media data is a digital image, audio, video, etc. In one embodiment, the media data may include data not normally associated with media playback, but more typically associated with sensors, e.g. temperature, accelerometer data, magnetic field strength, chemical sensors, global positioning signals, etc. In one embodiment, the media data may result from an edit operation of processing logic performed on an existing media data. For example, processing logic may reside in a digital camera that enables cropping, rotating, resizing, color adjustment, etc. operations to be performed on an image stored on digital camera. In one embodiment, the edited version of the image is handled by processing logic as newly captured media data. Further, edit operations that result in the "capture" of these new edited media object may also be made to existing audio, video, and sensor, data.

Processing logic stores the captured media data at a device storage (processing block 604). The media data may be stored, according to embodiments discussed herein, to a removable storage media external to processing logic.

A cryptographic hash is then calculated for the media data (processing block 606). In one embodiment, the cryptographic hash includes the captured media data and at least one prior log entry stored in a camera log. As will be discussed below, the cryptographic hash of the media data may be calculated from the media data and a plurality of log entries (i.e., the most recent 20 log entries) stored in metadata fields of the captured media data file to enable authentication of the media object from the media object itself or other media objects.

A prior log entry is read from a log, which stores the camera log or mirrors the camera log, and published to a logging server (processing blocks 608 and 610). In one embodiment, the entry from the log is published directly by processing logic to an external system such as the logging server. In one embodiment, the log is first published to a computer coupled with processing logic and then published from the computer to the logging server. Processing logic then makes a new log entry based on the publication results (processing block 612).

Figure 6B:
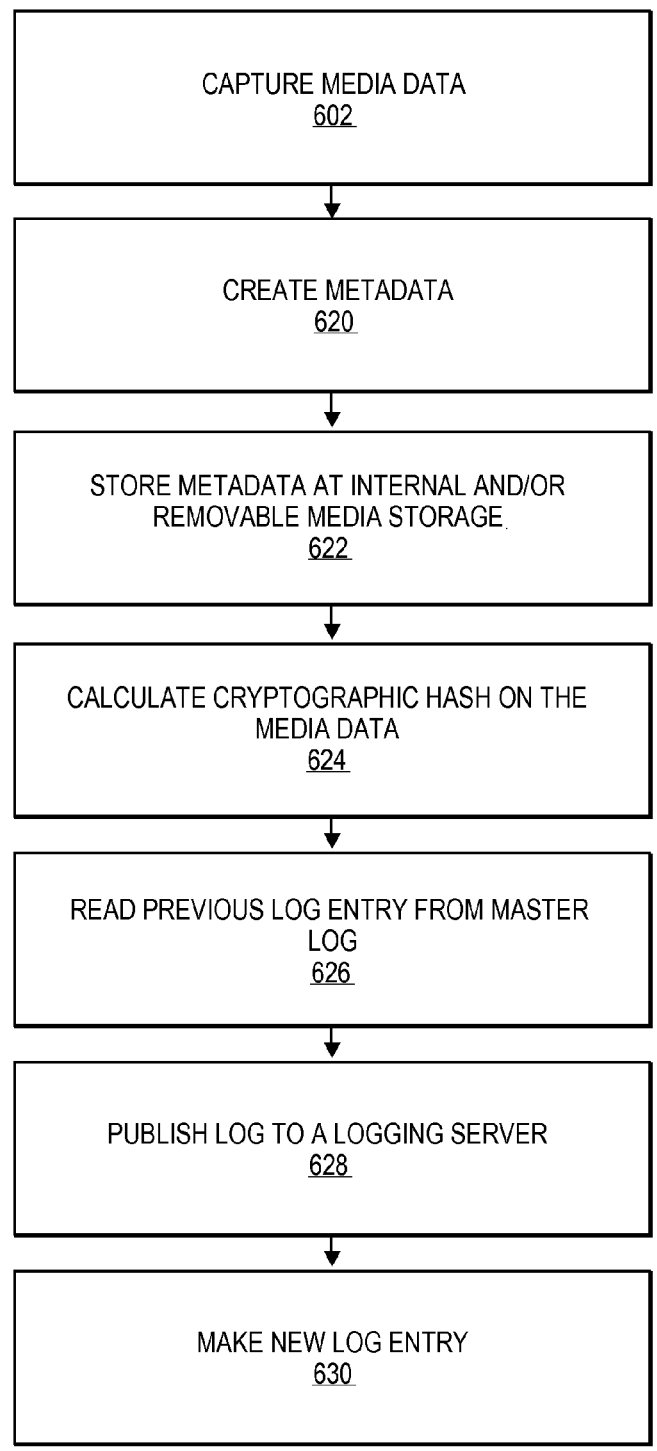
FIG. 6B is a flow diagram of one embodiment of a process for maintaining a camera log.

FIG. 6B is a flow diagram of one embodiment of a process for maintaining a camera log. The process is performed by processing logic that may comprise hardware (circuitry, dedicated logic, etc.), software (such as is run on a general purpose computer system or a dedicated machine), or a combination of both.

Referring to FIG. 6B, the process begins by processing logic capturing media data (processing block 602). In one embodiment, while processing blocks 604-612, processing logic also creates metadata (processing block 620). In one embodiment, the created metadata is data associated with captured media data, such as, for example, a timestamp indicating when media data was captured, a geospatial marker (e.g., global positioning system data) indicating where media data was captured, etc.

Processing logic stores the metadata at device storage and calculates a cryptographic hash on the captured metadata (processing blocks 622 and 624). Similar to the captured media data discussed above, the cryptographic hash is a hash of the metadata and at least one most recent log entry from a camera log.

A log entry is then read from the master log (processing block 626) and published to a logging server (processing block 628). The results of the publication are then added to the camera log (processing block 630).

Figure 7:
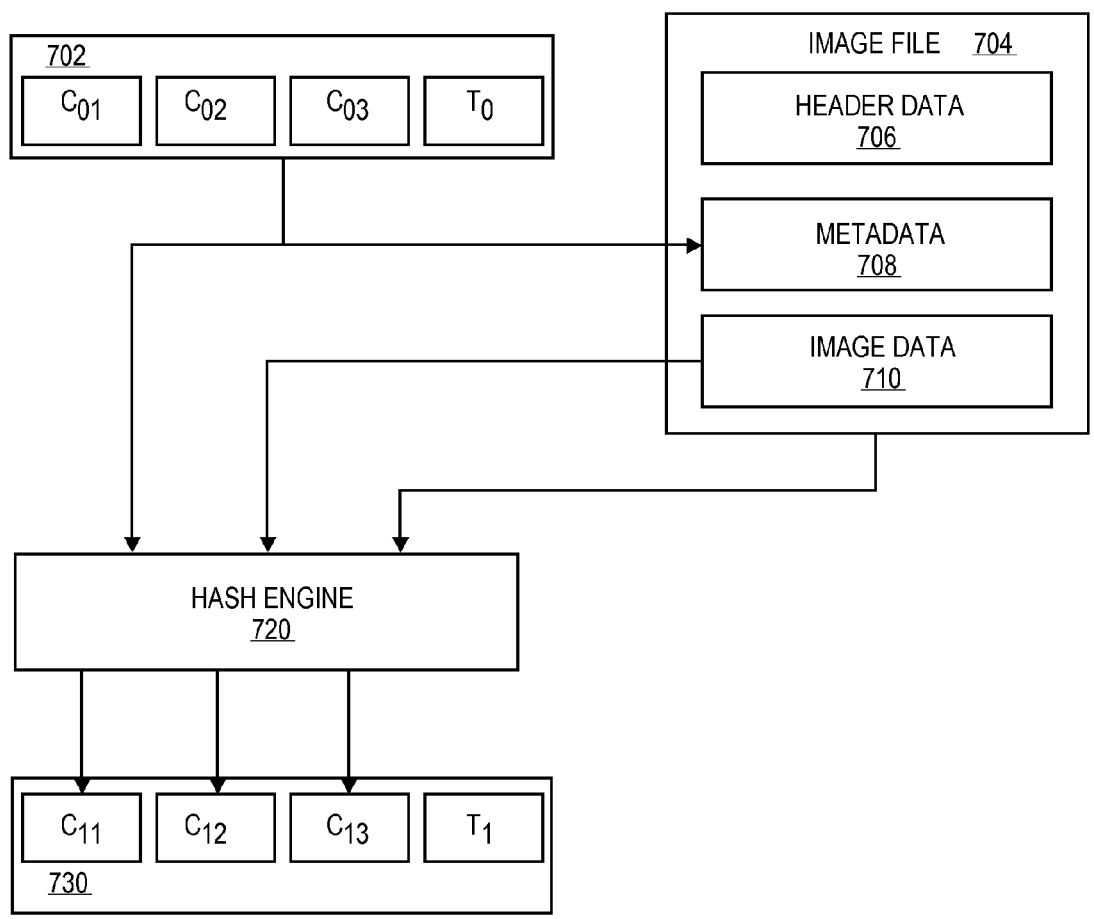
FIG. 7 illustrates one embodiment of the creation of a new log entry.

FIG. 7 illustrates one embodiment of the creation of a new log entry 730 from an existing log entry 702 and an image file 704. As discussed above, a camera log consists of a sequence of entries, $e_i$, where each entry is written once to a master log of the digital camera, and those entries are never updated by the digital camera, a user, an external system, etc. In order to prevent unwanted editing of a master log, the master log may be maintained in write once memory, or the digital camera could configured to prevent changes to master log entries. In one embodiment, digital camera does not include a software or hardware interface that allows arbitrary changes to the master log.

In one embodiment, each log entry, $e_i$, may consists of one or more Content Based Identifiers (CBIs), and optionally a text field. As illustrated in FIG. 7, the CBIs for the $0^{th}$ log entry 702 are labeled $C_{01}$, $C_{02}$, $C_{03}$, while the text field is labeled $T_0$. Although FIG. 7 illustrates log entry 702 as including 4 entry fields (i.e., three CBI fields and a text field), any number of fields may be utilized to form a log entry. In one embodiment, hash engine 720 computes log entries using various hashing functions, as discussed above.

FIG. 7 is discussed with reference to image file 704. However, other media data file types (i.e., video, audio, etc.) may be utilized as discussed herein. In one embodiment, when an $i^{th}$ image 704 is captured by a digital camera, the most recent entry of the camera log 702 is stored in the metadata 708 of the resulting image file 704 and the image file is written to a device memory or transmitted. Then a new log entry 730 is generated by hash engine 720 and added to the camera log for the image file. In one embodiment, the new log entry 730 consists of, at a minimum, a cryptographic hash of image data 710 from the image file and a hash of a prior log entry. In other embodiments, the new log entry 730 may consist of a cryptographic hash of a combination of one or more of metadata 708, image file 704, and image data 710.

The location where camera log information, written as metadata 708 of the image file 704, depends on the format utilized to store captured image data. For example, with a JPEG image file, the log information could be written directly into marker segments, such as the APP marker segments. As APP1 and APP2 are used for EXIF data, in one embodiment, other $APP_n$ markers or COM markers are utilized to store metadata. In one embodiment, if the JPEG image file contains EXIF metadata in an APP1 marker segment, as specified by the EXIF Standard, the log information could be stored in an ASCII field of the text metadata e.g. ImageDescription, Make, Model, Software, Artist, or Copyright fields. In one embodiment, camera log information could also be stored in the UserComment Tag.

In the embodiments discussed herein, camera log information is written to a location of an image file that will not be changed by image or metadata applications (e.g., a lossy image compression application). Furthermore, in one embodiment, the camera log information is written in a delimited manner that enables easy extraction of the log information from a media data file. In one embodiment, a common initial string that identifies the start of camera log information, and a length of expected information, is written along with the camera log information. Image file metadata may be stored as camera log information in JPEG or EXIF image formats, as well as various other image file formats specific to particular cameras that provide binary or ASCII data storage.

In one embodiment, the image file 704 may be transferred to another location, such as by a direct wireless connection of a digital camera, a cable attached to a computer, or by removing a camera's memory card. The new location may establish an independent time for the image file. This time could be the time used by an image sharing service, a time explicitly obtained from a time stamping service (e.g. an independent company like Surety or digital notarization service that provides verifiable time stamping data), or a time from a controlled environment like a police evidence room, etc. that has received the image file.

In one embodiment, when the $i^{th}$ picture is taken, the camera writes the most recent twenty log entries in fields of the image file. The camera may also include a variety of even older log entries, perhaps every 20th log entry, i.e. i–20k, or the log entry for all images with a number a multiple of 20, i.e. 20k for all k<i/20. By including more than one log entry, a camera log may be reconstructed, at least in part, even when not all log entries are available, as discussed in greater detail below.

In one embodiment, a digital camera may include a value of a previous log entry in additional to the log entry for the previous image file. As a result, the order of images may also be determined using the log entries, even when not all image files are produced. In one embodiment, the log might also contain the CBI for image data or the compressed image data from the image file. This allows the proper image to be identified even if the metadata of the image file has changed.

In one embodiment, where a digital camera enables editing of the image file 704, the newly edited image is treated and/or stored as a new image file. A digital camera, as discussed herein, may enable edit operations resulting in the storage of a new camera log entry corresponding to the edited image file. In one embodiment, the type of editing performed on the image file may be stored in text field $T_i$ in a log entry. This text field might indicate that an image was obtained on the camera from another image by cropping.

For evidentiary and authentication purposes, the means that an image was generated by a digital camera is important. As cameras obtain greater editing capabilities, it will become increasingly important to be able to determine if the data stored and authenticated by a digital camera accurately represents an original image, or has been modified to, for example, obscure evidence.

Figure 8:
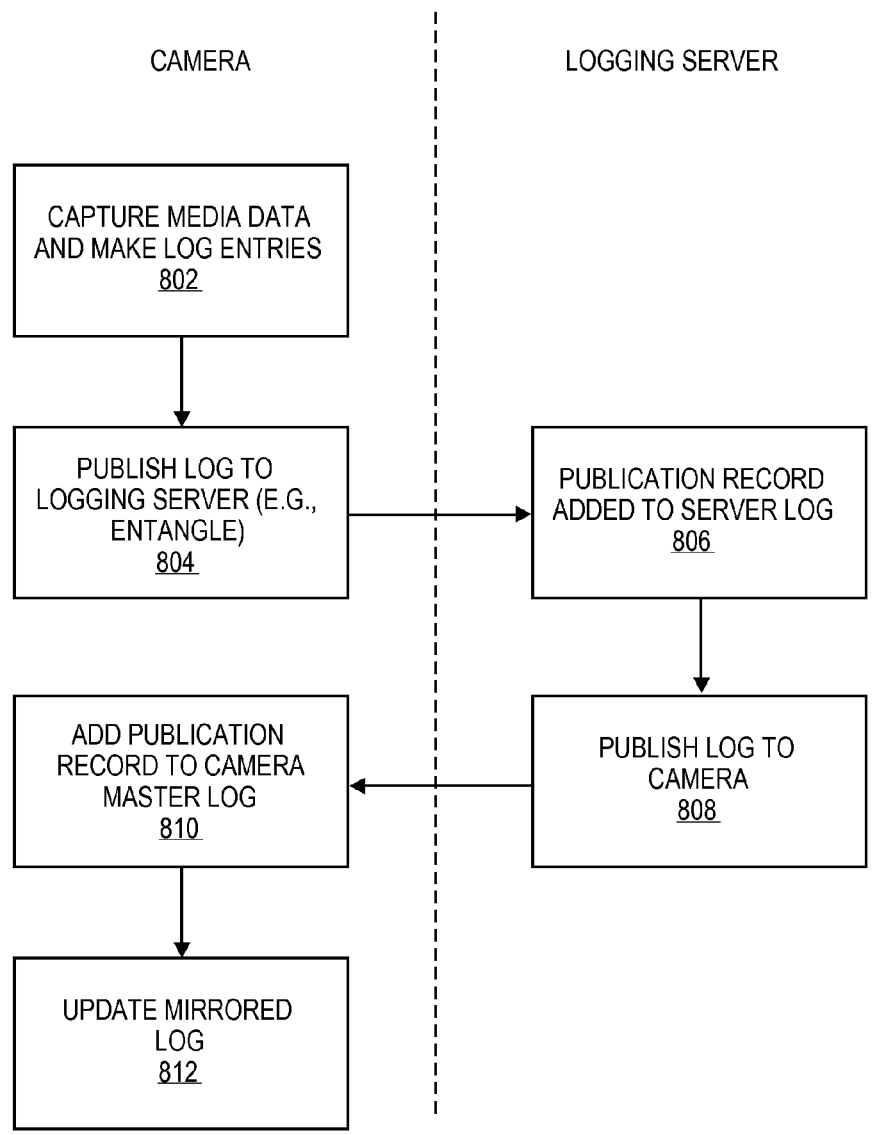
FIG. 8 is a flow diagram of one embodiment of a process for publishing camera logs.

FIG. 8 is a flow diagram of one embodiment of a process for publishing camera logs. The process is performed by processing logic that may comprise hardware (circuitry, dedicated logic, etc.), software (such as is run on a general purpose computer system or a dedicated machine), or a combination of both.

Referring to FIG. 8, the process begins by processing logic capturing media data and making log entries, as discussed above (processing block 802). Processing logic then publishes the log entries to a logging server (processing block 804). In one embodiment, the log entries are published to the logging server via an on-demand communications interface such as a WiFi, Edge, Bluetooth, etc. communications interface. Further, in on embodiment, each new media data and each new metadata associated with the new media data is published to the logging server.

Processing logic adds a publication record to a server log for each publication received at a logging server (processing block 806). The log entries are then published from the logging server back to the digital camera (processing block 808). In one embodiment, log entries published from the logging server may include information such as a URL to identify a location where the log data was stored. In one embodiment, the log entry might also include external 'freshness' information that can be used to establish the time data was added to the log. Processing logic adds the publication records to the camera's master log (processing block 810) and updates a mirrored log with the newly added log entries (processing block 812).

Figure 9:
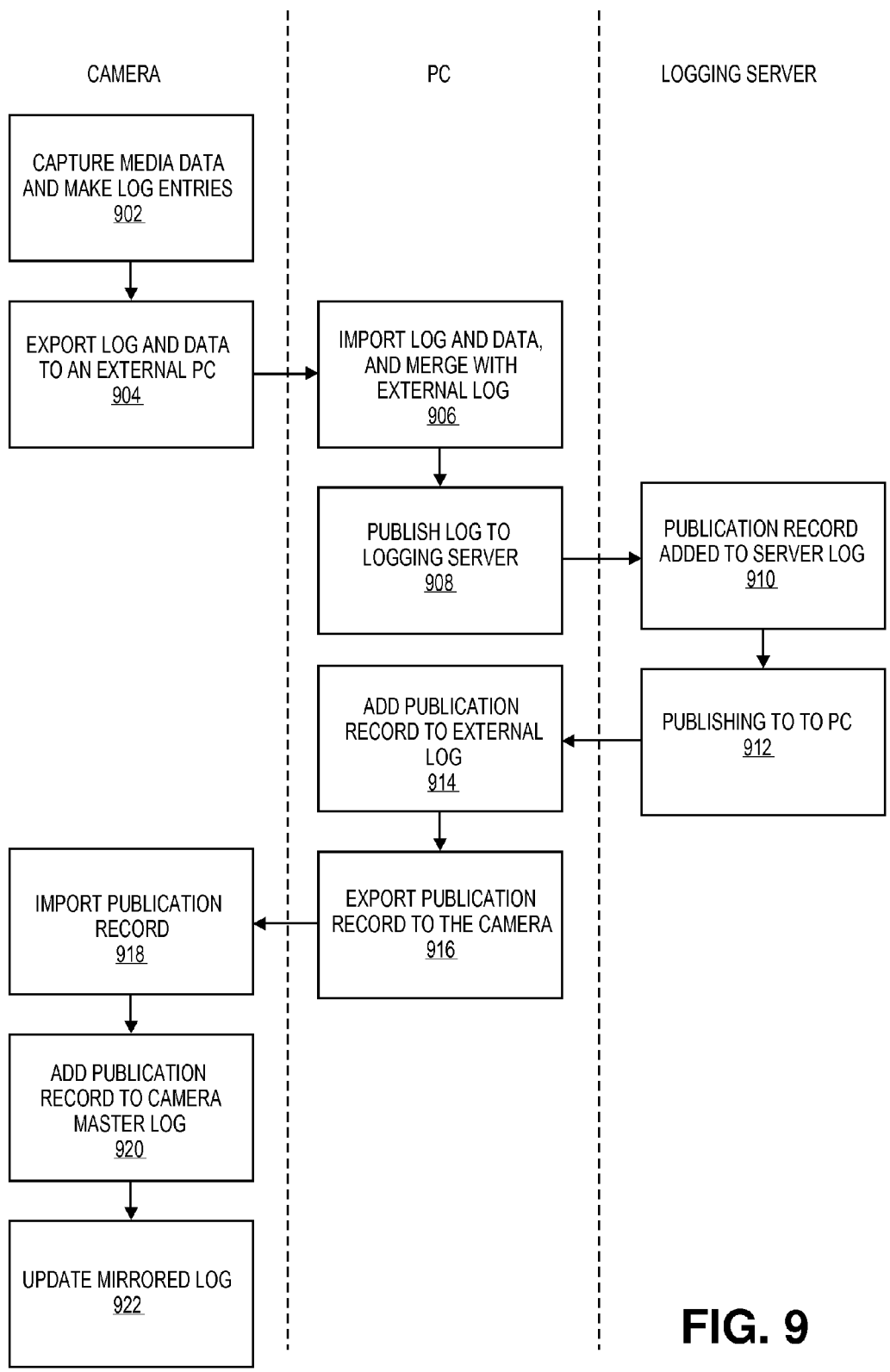
FIG. 9 is a flow diagram of another embodiment of a process for publishing camera logs.

FIG. 9 is a flow diagram of another embodiment of a process for publishing camera logs. The process is performed by processing logic that may comprise hardware (circuitry, dedicated logic, etc.), software (such as is run on a general purpose computer system or a dedicated machine), or a combination of both.

Referring to FIG. 9, the process begins by processing logic capturing media data and making log entries, as discussed above (processing block 902). The log and media data are exported to an external personal computer (PC) (processing block 904). In one embodiment, the log entries and media data are stored in a removable storage of a digital camera, such as a flash memory card, and exported to the PC by plugging the flash media card into the PC. In one embodiment, the log entries and media data are exported via a communications interface such as a USB cable, Firewire cable, etc. coupled with PC.

Processing logic imports the log to the PC and merges the received log entries with an external log maintained by the PC (processing block 906). Processing logic then publishes the log entries to a logging server (processing block 908).

Processing logic adds a publication record to a server log for each publication received at the logging server (processing block 910). The log entries are then published form the logging server back to the PC (processing block 912). Processing logic adds the publication records to the PC's external log (processing block 914) and exports the publication records to the camera (processing block 916).

Processing logic, detecting new log entries at the PC, imports the publication records to camera and adds the records to camera's master log (processing blocks 918 and 920). After adding the new records to the master log, processing logic updates a mirrored log (processing block 922).

Media Data Verification via Camera Logs

At some point, it may be desirable to verify or authenticate a particular media data file, metadata, or other sensor data. That is, it may be useful to determine what pictures from a group were captured by a camera, what video was recorded at a camera, etc. In embodiments discussed above, and as will be discussed below, media data may be verified from the media data file itself, without the use of cryptographic keys, passwords, etc.

Figure 10:
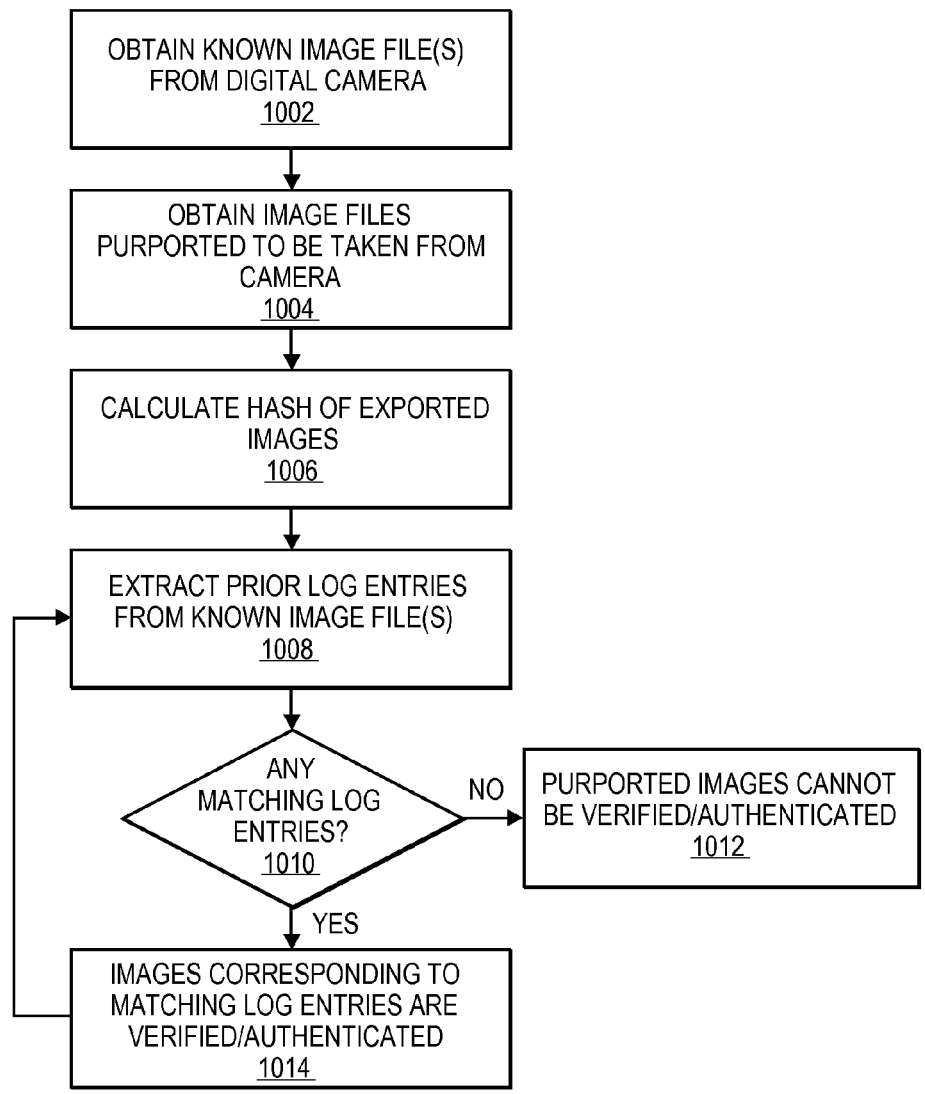
FIG. 10 is a flow diagram of one embodiment of a process for verifying a media data file.

FIG. 10 is a flow diagram of one embodiment of a process for verifying a media data file. The process is performed by processing logic that may comprise hardware (circuitry, dedicated logic, etc.), software (such as is run on a general purpose computer system or a dedicated machine), or a combination of both. Although the process of FIG. 10 discusses the verification and authentication of image files, the process applies to any type of media data, metadata, or other sensor data.

Referring to FIG. 10, the process begins by processing logic obtaining known image file(s) from a digital camera (processing block 1002). In one embodiment, images are referred to as "known" when the image file is obtained from the camera under a controlled process to ensure that the image file does indeed come from the camera. In one embodiment, the controlled process might include, for example, examining the camera for evidence of physical tampering, or broken seals on electronic components or sensors, and then inserting a memory card known to be blank, taking a photograph with the camera, and storing the image and mirrored log on the memory card. The memory card may be transferred to a known virus free computer, and the log known to come from the camera may be used to search for hash chains to CBIs of unknown images.

Processing logic then obtains image files purported to be taken from the camera (processing block 1004). The cryptographic hash is the calculated for each of the obtained purported images (processing block 1006). Note that because the image file stores image data, as well as prior log entries, time stamp data, geospatial markers, etc., calculation of a hash from the image file results in a CBI for the image file based on the image data, prior log entries, and additional metadata.

Log entries are then extracted from the known image file(s) (processing block 1008). As discussed above, log entries are stored in metadata fields of an image. Thus the metadata fields of a known image store cryptographic hash values that correspond to prior images captured by the camera. Because there exists a hash chain from the master log extracted under verifiable conditions to the image, the image is known, and trusted to be from the camera, and the log entries extracted from the trusted image are also considered as known and trusted. Thus, in one embodiment, matching the known and trusted log entries guarantees that a purported image, and associated metadata, was also captured by the camera. In one embodiment, processing logic compares the computed hash values with the log entries extracted from the known image file(s) (processing block 1010).

When a computed hash value of an image file matches an extracted log entry, processing logic verifies and authenticates that the image file was captured by the camera (processing block 1014), and as a result also verifies that the image file, and any associated metadata stored in the image file, has not been edited since the log entry corresponding to the verified image was stored in the known image file. The authenticated and verified image file may then be treated as a known image file, due to the image file's authentication, and log entries extracted from the new known image (processing block 1008). Processing logic continues to authenticate and verify image file(s) until no matches are found. When processing logic does not detect any matching hash values and log entries, none of the remaining purported images can be verified and/or authenticated as having been taken by the camera (processing block 1012).

As discussed above, in one embodiment, log entries stored in metadata of an image file may be ordered. Thus, the most recent image contains a log entry corresponding to a previous image file, which in turn, contains a log entry of a previous image file. In one embodiment, where each image file contains only one entry from the log, then the set of purported pictures can only be verified and authenticated if all pictures are available. However, in an embodiment where each image file contains multiple log entries, then it is possible to determine which images file(s) have been taken by the camera even if not all images are available. If any of the log files extracted from the known image file match a hash of an available image file, then that image file can be authenticated as having come from the camera, the log can be extracted, and all entries from that log can be used to find additional image files that came from the camera. In one embodiment, the order images were taken is known from the order of log entries in the image files.

In one embodiment, a more precise time can be determined from the image files. If the camera records changes to a clock in the master log (e.g., timing data), and the timing data has not been corrupted (e.g., the camera has not been tampered with, the clock has not been changed, the battery has not died, etc.), then the time written into the metadata of a verified image file can be subtracted from the time written into the metadata of the known image, and added to the correct time for the known image.

In one embodiment, when the camera is not available, it is still possible to determine a latest time an image was taken. Suppose an image was taken by the camera and uploaded to a website that maintains a logging server, picture storage service, etc., and that the time recorded for the upload by the website, $t_1$, is trusted. That image must of course have been taken before $t_1$. Further, any image file with a corresponding log entry in the known file must have been taken before $t_1$. Thus, any of these image file(s) must have been taken before time $t_1$. If a complete log is available from Image A back to Image B and the clock on the camera is believed not to have been tampered with, then Image B can be believed to have come before $t_1-(t_a-t_b)$, where $t_a$ and $t_b$ are the times in the files for Image A and Image B. While not everyone may trust the time, $t_1$, assigned by the website, if the same image or a different image from the same sequence has been saved somewhere else, and the time assigned by that operation is under independent control, then there is a second estimate possible for the time of the sequence of images.

In one embodiment, 'freshness' times for images taken by the camera may be determined by establishing that a particular piece of data was generated after a particular date. For example, an image may be taken of a newspaper that contains a date and information which became available on that date. The image of the newspaper can be extracted as "known" under the controlled process. An image taken by the camera after the image of the newspaper will include a hash chain to that image, and thus must have been taken after the time shown in the newspaper. The newspaper should also be verified to actually contain the stories published that day.

Another example of a known image, which has independent verification details, includes an image taken of a machine generated barcode, such as a barcode generated at a web page, that is unique and independently verifiable, etc. If the barcode is generated at a certain time by a trusted authority in an unpredictable fashion, then pictures which contain a hash chain to the barcode image must have been taken after the time the barcode was determined. Using a barcode, or other machine readable data, allows a number to be extracted automatically from the image, and compared with numbers known to be published after a certain time.

In one embodiment, when media data files are authenticated and validated from a known file, other metadata recorded to the media files is also authenticated. Thus, if metadata such as geospatial data, user login data, organization identification data, etc. is recorded to image files, and those image files are verified from a known/trusted image file, then the accompanying metadata is also verified.

Exemplary Camera Log Applications

As discussed above, a digital camera maintains a log for captured media data and metadata in an embedded, and limited access log. By maintaining the embedded log of running media data and metadata file hashes, and publishing log entries (i.e., entangling the log) with external logs, a digital camera creates verifiable, tamper-proof markers, which can be utilized to establish the integrity of media data and associated metadata. Furthermore, the validated media data can be placed in a certain temporal, geospatial, user, organizational, etc. context.

In one exemplary scenario, a police officer may take a picture using a WiFi-capable digital camera. Using the WiFi uplink, the picture may be tagged with time and place markers (timestamp, GeoFi, GPS geo-tag, etc.), camera ID, user ID, organization ID, etc. When the pictures are published to a government-hosted time logging server via a web service front end, the camera log is entangled with the government server logs. The government server log can be later used in court to prove, via the mechanisms described herein, that the image has not tampered with, to verify a place and time where the images were captured, etc.

In another exemplary scenario, during a trip to Country X, a journalist takes pictures of human rights abuses at the hand of officials of Country X. When uploading pictures to his laptop, a plug-in application (e.g., a FLICKR plug-in) automatically publishes log entries from the camera log with the 3 party log service. If these photos are printed in a publication that upsets the Country X officials, the journalist can easily rebuke attempts of the country X officials to dismiss his pictures as forgeries.

An Example of a Computer System

FIG. 11 is a block diagram of a computer system that may perform one or more of the operations described herein. Referring to FIG. 11, computer system 1100 may comprise an exemplary client or a server computer system. Computer system 1100 comprises a communication mechanism or bus 1111 for communicating information, and a processor 1112 coupled with bus 1111 for processing information. Processor 1112 includes a microprocessor, but is not limited to a microprocessor, such as, for example, a CORE™ processor, etc.

System 1100 further comprises a random access memory (RAM), or other dynamic storage device 104 (referred to as main memory) coupled to bus 1111 for storing information and instructions to be executed by processor 1112. Main memory 1104 also may be used for storing temporary variables or other intermediate information during execution of instructions by processor 1112.

Computer system 1100 also comprises a read only memory (ROM) and/or other static storage device 1106 coupled to bus 1111 for storing static information and instructions for processor 1112, and a data storage device 1107, such as a magnetic disk or optical disk and its corresponding disk drive. Data storage device 1107 is coupled to bus 1111 for storing information and instructions.

Computer system 1100 may further be coupled to a display device 1121, such as a cathode ray tube (CRT) or liquid crystal display (LCD), coupled to bus 1111 for displaying information to a computer user. An alphanumeric input device 1122, including alphanumeric and other keys, may also be coupled to bus 1111 for communicating information and command selections to processor 1112. An additional user input device is cursor control 1123, such as a mouse, trackball, trackpad, stylus, or cursor direction keys, coupled to bus 1111 for communicating direction information and command selections to processor 1112, and for controlling cursor movement on display 1121.

Another device that may be coupled to bus 1111 is hard copy device 1124, which may be used for printing instructions, data, or other information on a medium such as paper, film, or similar types of media. Furthermore, a sound recording and playback device, such as a speaker and/or microphone may optionally be coupled to bus 1111 for audio interfacing with computer system 1100. Another device that may be coupled to bus 1111 is a wired/wireless communication capability 1125 to communication to a phone or handheld palm device.

Note that any or all of the components of system 1100 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method, comprising:
   maintaining an embedded log in a device with at least one sensor, the at least one sensor for capturing media data and the embedded log being a chain of log entries;
   adding at least one new log entry to the embedded log when media data is captured by the at least one sensor of the device, wherein at least one previous log entry is added to one of a plurality of metadata fields of a media data file for the captured media data, and the at least one new log entry includes a hash of the media data file; and
   publishing the at least one new log entry to a location external to the device.

2. The method of claim 1, wherein the at least one new log entry includes one additional log entry for each of the captured sensor data and metadata created by the device that is associated with the captured sensor data.

3. The method of claim 2, wherein the captured sensor data is one of a picture data, audio data, video data, temperature, global positioning data, chemical sensor data, or a new version of media data stored on the device edited from an existing media data.

4. The method of claim 1, further comprising:
   uploading the captured sensor data and the at least one new entry from a mirrored log to a computing device, wherein the computing device is operable to publish the at least one log entry to the location external to the device from the mirrored log.

5. The method of claim 4, wherein the embedded log is maintained in a storage of the device inaccessible to the location external to the device, and the mirrored log is stored in storage of the device accessible to the location external to the device.

6. The method of claim 1, wherein the at least one log entry is published to the location external to the device from a communications interface of the device.

7. The method of claim 1, further comprising:
   publishing an existing log entry to the location external to the device periodically even when no new sensor data has been captured by the device since a last publication to the location external to the device.

8. The method of claim 1, wherein the at least one new log entry is published to the location external to the device to entangle the at least one new log entry with a log maintained at the location external to the device.

9. The method of claim 8, further comprising:
   receiving publication results from the location external to the device, wherein the publication results include a log entry from the log maintained at the location external to the device; and
   adding at least one new entry to the embedded log based on the publication results.

10. The method of claim 1, wherein the one of a plurality of metadata fields is not altered when the media data file is compressed.

11. A non-transitory computer readable storage medium storing instructions thereon which, when executed by a system, cause the system to perform a method comprising:
   maintaining an embedded log in a device with at least one sensor, the at least one sensor for capturing media data and the embedded log being a chain of log entries;
   adding at least one new log entry to the embedded log when media data is captured by the at least one sensor of the device, wherein at least one previous log entry is added to one of a plurality of metadata fields of a media data file for the captured media data, and the at least one new log entry includes a hash of the media data file; and
   publishing the at least one new log entry to a location external to the device.

12. A media capture device, comprising:
   a memory of the media capture device to store an embedded log in the media capture device, the embedded log being a chain of log entries;
   an image sensor to capture image data;
   a hash engine to add at least one new log entry to the embedded log when the image data is captured by the image sensor, wherein at least one previous log entry is added to one of a plurality of metadata fields of an image file for the captured image data, and the at least one new log entry includes a hash of the image data file; and
   a communications interface to publish the at least one new log entry to a location external to the media capture device.

13. The media capture device of claim 12, wherein the at least one new log entry includes one additional log entry for each of the captured image data and metadata associated with the captured image data.

14. The media capture device of claim 13, wherein the metadata includes one or more of a timestamp, a geospatial marker, and an edit operation associated with the media data.

15. The media capture device of claim 13, wherein the metadata includes a plurality of prior log entries from the embedded log.

16. The media capture device of claim 12, further comprising:
   a removable storage coupled with the media capture device to store a mirrored log synchronized with the embedded log.

17. The media capture device of claim 16, wherein the memory of the media capture device is inaccessible to the location external to the digital camera, and the removable storage is accessible to the location external to the digital camera.

* * * * *